US008155587B2

(12) United States Patent
Sasai et al.

(10) Patent No.: US 8,155,587 B2
(45) Date of Patent: Apr. 10, 2012

(54) COMMUNICATION METHOD, COMMUNICATION SYSTEM, AND COMMUNICATION DEVICE FOR PERFORMING COMMUNICATION HAVING ALTERING COMMUNICATION RANGES

(75) Inventors: Takashi Sasai, Kanagawa (JP); Makoto Sato, Tokyo (JP); Hiroshi Kakuda, Tokyo (JP); Kazuya Odagiri, Kanagawa (JP); Koji Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 10/486,426

(22) PCT Filed: Jun. 9, 2003

(86) PCT No.: PCT/JP03/07286
§ 371 (c)(1),
(2), (4) Date: Feb. 9, 2004

(87) PCT Pub. No.: WO03/105409
PCT Pub. Date: Dec. 18, 2003

(65) Prior Publication Data
US 2004/0203359 A1 Oct. 14, 2004

(30) Foreign Application Priority Data
Jun. 10, 2002 (JP) .................................. 2002-169011

(51) Int. Cl.
*H04B 7/00* (2006.01)
(52) U.S. Cl. ............... 455/41.2; 455/522; 455/456.1; 455/456.2; 455/456.6; 455/466; 455/422.1; 455/90.3; 455/41.1; 455/41.3
(58) Field of Classification Search ................. 455/41.1, 455/41.2, 41.3, 127.1, 102, 132, 557, 522, 455/126, 426.1, 462.2, 464, 434, 574
See application file for complete search history.

(56) References Cited

U.S. PATENT DOCUMENTS 6,150,956 A * 11/2000 Laufer ........................ 340/903
6,571,103 B1 * 5/2003 Novakov ...................... 455/464
(Continued)

FOREIGN PATENT DOCUMENTS

JP 11-355279 12/1999
(Continued)

OTHER PUBLICATIONS

European Search Report dated Nov. 19, 2009, for European Patent Application No. 03 73 6110.2 (3 pages).

(Continued)

*Primary Examiner* — Willie J Daniel, Jr.
(74) *Attorney, Agent, or Firm* — Finnegan, Henderson, Farabow, Garrett & Dunner, L.L.P.

(57) ABSTRACT

When wireless communications are performed with other communication devices, an inquiry message to discover other communication devices residing in the vicinity is wirelessly transmitted by having communication ranges altered at a plurality of stages; response messages to the transmitted inquiry message are received; information relating to a receiving state or frequency of receipt of the response messages from the respective communication ranges is preserved with respect to each communication device which is a source of the response message; and based on the preserved information relating to the receiving state or the frequency of receipt of the response messages a communication device to be a connection object for wireless communication is selected. By doing so, when short-range wireless communications are performed, communication services can be performed appropriately between required devices.

10 Claims, 13 Drawing Sheets

U.S. PATENT DOCUMENTS

| | | | |
|---|---|---|---|
| 6,829,467 B2 * | 12/2004 | Ochiai | 455/41.2 |
| 6,892,052 B2 * | 5/2005 | Kotola et al. | 455/41.2 |
| 6,901,057 B2 * | 5/2005 | Rune et al. | 370/310 |
| 6,968,153 B1 * | 11/2005 | Heinonen et al. | 455/11.1 |
| 6,970,714 B2 * | 11/2005 | D'Souza et al. | 455/522 |
| 6,990,080 B2 * | 1/2006 | Bahl et al. | 370/254 |
| 7,039,445 B1 * | 5/2006 | Yoshizawa | 455/575.7 |
| 7,164,885 B2 * | 1/2007 | Jonsson et al. | 455/41.2 |
| 7,395,029 B2 * | 7/2008 | Sasai et al. | 455/41.2 |
| 7,406,093 B2 * | 7/2008 | Furuyama et al. | 455/522 |
| 2002/0137472 A1 * | 9/2002 | Quinn et al. | 455/90 |
| 2005/0026608 A1 * | 2/2005 | Kallio et al. | 455/431 |
| 2005/0075084 A1 * | 4/2005 | Salokannel et al. | 455/126 |
| 2006/0052069 A1 * | 3/2006 | Odagiri et al. | 455/127.1 |

FOREIGN PATENT DOCUMENTS

| | | |
|---|---|---|
| JP | 2001-109486 | 4/2001 |
| JP | 2001-144781 | 5/2001 |

OTHER PUBLICATIONS

J. Haartsen, "Bluetooth—The Universal Radio Interface for Ad Hoc, Wireless Connectivity," Ericsson Review, No. 3, Jan. 1, 1998, pp. 110-117.

* cited by examiner

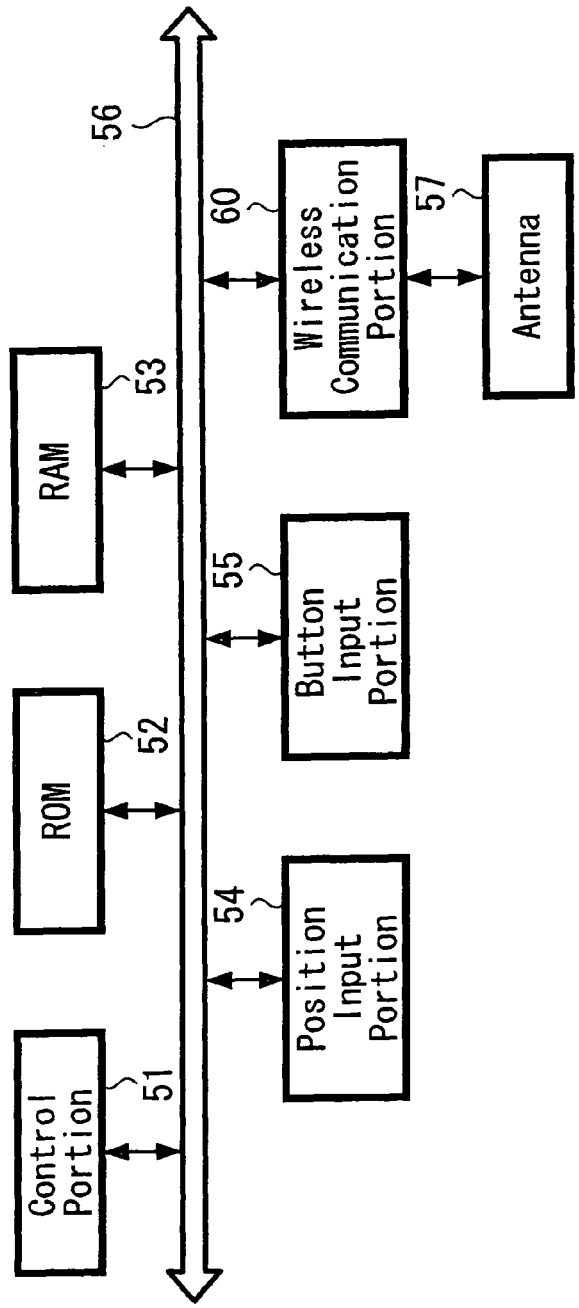
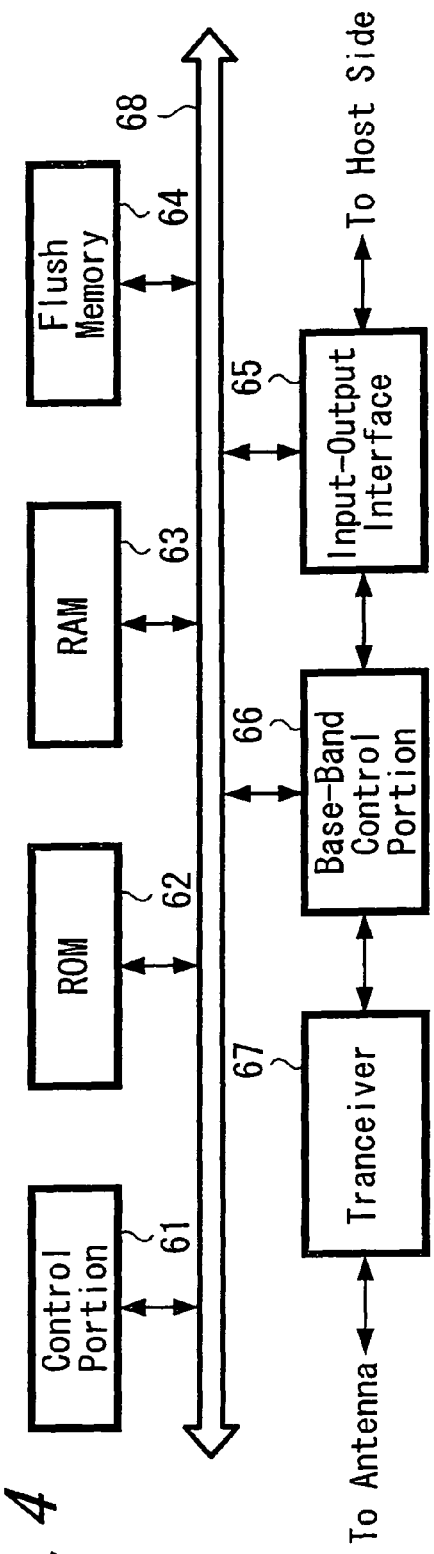
FIG. 3
FIG. 4

Device to be Discovered

Device to be Discovered

FIG. 10

| Time | Distance | Device Number List |
|---|---|---|
| 20:20:00 | 15cm | 1 |
| 20:20:20 | 1m | 1, 2 |
| 20:20:40 | 5m | 1, 2, 3 |
| 20:21:00 | 10m | 1, 2, 3, 4, 5, 6 |
| 20:21:20 | 15cm | 1 |
| ... | ... | ... |

FIG. 11

| Device Number | Distance | Device Information | |
|---|---|---|---|
| 1 | AA:AA:AA:AA:AA:AA | 0x520204 | (Portable phone, being apparatus having device for telephone service and object transfer) |
| 2 | BB:AA:AA:AA:AA:BB | 0x100114 | (Portable type PC, being apparatus having device for object) |
| 3 | CC:AA:AA:AA:AA:CC | 0x001f00 | (Other device) |
| 4 | DD:AA:AA:AA:AA:DD | 0x00010c | (laptop computer) |
| ... | ... | ... | |

FIG. 17

| Device Number | Communication Data Volume | Starting Time | Ending Time |
|---|---|---|---|
| 1 | 100KB | 10:00:00 | 12:00:00 |
| 2 | 2MB | 12:00:00 | - |
| 1 | 1.6MB | 13:00:00 | - |
| ... | ... | ... | ... |

COMMUNICATION METHOD, COMMUNICATION SYSTEM, AND COMMUNICATION DEVICE FOR PERFORMING COMMUNICATION HAVING ALTERING COMMUNICATION RANGES

TECHNICAL FIELD

The present invention relates to a communication method suitable for a relatively short-range wireless communication method, a communication system to implement the communication method and a communication apparatus applied to the communication system.

BACKGROUND ART

Recently, a communication method called Bluetooth® communication is drawn attention as a method for wireless communication of a relatively short-range up to approximately 100 meters at maximum, and a variety of corresponding devices are being developed.

A short-range wireless communication system like Bluetooth communication using radio signals of relatively high frequency waves has merits such as having no directivity and having a high transmissivity in comparison with a infrared communication method using infrared signals, and it is expected that corresponding devices continue to increase in the future.

In a communication system to which an infrared communication method is applied, in order to establish a connection for communication it was necessary to specify objects establishing communication by having a light emitting portion and a light receiving portion of devices as the connection objects positioned to face each other. Also, during the communication it was necessary to maintain the same positions as those at the time of the connection due to its directivity. On the other hand, in a communication system such as the Bluetooth communication using high frequency signals, there needs no such limitation to the positioning.

In case of Bluetooth communication, an inquiry message is transmitted as a broadcast message from a device which desires to start communications (hereinafter referred to as a device A) in order to discover devices residing in the vicinity. Then, devices having received the inquiry message from the device A transmit response messages to the device A in response to the inquiry message. By receiving response messages successively from respective devices residing in the vicinity, the device A can discover a plurality of communicable devices residing in the vicinity. In accordance with information in those response messages, the device A selects and specifies a device with which a connection is tried to establish and performs a connection processing with respect to the selected device. Hereupon, when response messages are received from a plurality of devices, in most cases, conventionally they are displayed in a form of a list so that a user can select a device.

In Bluetooth communication, not only a communication path is established, but also what kind of applications and services are to be performed on the communication path is provided clearly as a profile. As profiles, there are a serial port profile to perform serial communications, a personal area networking profile to realize a personal area network and the like. A service discovery protocol (hereinafter referred to as a SDP) is provided as a procedure to determine those profiles and what kind of services actually are performed.

The device A transmits to a device desired for a connection (hereinafter referred to as a device B) an inquiry message querying what kind of services are provided by the device B in accordance with the SDP, and the device B receives the inquiry message from the device A and transmits to the device A information relating to its available services as a response message to the inquiry message. If the device B provides a desired service, the device A having received the response message requests communications with respect to the service, and the desired service is to be started between the device A and the device B.

As stated above, a basic communication procedure in the Bluetooth communication is that first, the device A transmits an inquiry message to discover devices residing in the vicinity and receives response messages to the inquiry message, further, selects a desired device among those devices having responded, furthermore, queries the selected device whether a desired service is available, and then, requests communications for the desired service.

The Bluetooth standard is governed by Bluetooth SIG Inc. and specifications describing its details are published by Bluetooth SIG Inc.

Hereupon, in a short-range wireless communication system such as the Bluetooth communication, an inquiry message to discover devices residing in the vicinity is targeted to all devices which reside within a communicable range (for example, from 10 meters to 100 meters). Because of this, an enormous number of response messages are to be received, when there are many communicable devices residing in the vicinity.

Conventionally, there needs an operational procedure wherein information relating to devices contained in those response messages is shown in a display or the like and a user makes a selection of a desired device, however, when there were many devices residing in the vicinity, there was a problem that the user was forced to spend a huge amount of time for the selection procedure and its usability became worse. In addition, in order to judge whether a device was actually one desired for a connection, it was necessary to confirm information such as an ID provided by the device, and therefore, there was a possibility of causing excessive work on the user.

In order to solve the above problem, for example, a method is being proposed in Publication of Published Patent Application No. 2001-144781 issued by Japan Patent Office, wherein a procedure to discover a device desired for a connection is carried out efficiently by altering a reaching range of an inquiry message. According to the method, a device desired for a connection can be specified efficiently by setting a search range for devices, for example, to a short distance so as to limit the number of devices to be discovered. However, when there is no connectable device residing within the range of the short distance, a user needs another processing such as searching again by further expanding a search range. Moreover, even if a reaching range of a message is limited to a short distance, a device held by a person is also discovered, when such a person happens to pass nearby. This problem still remains in consideration that all devices of personal belongings will become involved in networks in the future.

Also, with regard to devices having the purpose of providing services to a wide range such as providing an access point, there is a case wherein a service offering is intended evenly to devices residing in a wide range instead of offering a service only to devices residing in close vicinity. Moreover, in such devices as providing an access point which are permanently set up and are desired to be automatically managed, a user can not explicitly establish a connection.

The present invention is contrived in view of such circumstances and the object of the invention is to perform communication services simply and appropriately between devices, when wireless communications represented by the Bluetooth communication are performed.

DISCLOSURE OF THE INVENTION

The first aspect of the present invention is a communication method in which a communication device performs wireless communications with other communication devices, wherein an inquiry message to discover other communication devices residing in the vicinity is wirelessly transmitted as having communication ranges altered in a plurality of stages, response messages to the transmitted inquiry message are to be received, information relating to a receiving state or frequency of receipt of the response messages from the respective communication ranges is preserved with respect to each communication device which is a sender of the response message, and a communication device, which becomes a connection object for wireless communications, is selected based on the preserved information relating to the receiving state or the frequency of receipt of the response messages. By doing so, since a relationship regarding the distance with the responding device can be recognized by transmitting the inquiry message to the devices residing in the vicinity as having the communication ranges altered periodically, based on such information the connection is made possible to the device, for example, residing in as close vicinity as possible, so that a user can perform communications plainly and simply between devices.

The second aspect of the present invention is the communication method according to the first aspect of the present invention, wherein among communication devices performing functions required by the above communication device, the communication device having sent a response message transmitted to the inquiry message in the shortest communication range is selected as the connection object. By doing so, the communication device residing in the closest proximity can be selected automatically.

The third aspect of the present invention is the communication method according to the first aspect of the present invention, wherein among communication devices performing functions required by the above communication device, the communication device having sent a response message transmitted to the inquiry message in the shortest communication range is selected as the connection object, and furthermore, as the communication device performing the function required by the above communication device, a communication device having a function which has not been connected is chosen among communication devices having functions registered for a connection with the communication device. By doing so, when a plurality of communication devices reside in the closest vicinity, the device having a function which has not been connected is selected among the devices.

The fourth aspect of the present invention is the communication method according to the first aspect of the present invention, wherein a plurality of communication devices are almost evenly selected from communication ranges or the frequency of receipt thereof, when a plurality of communication devices are selected at the same timing or one after another as the connection objects. By doing so, a plurality of communication devices can be selected excellently.

The fifth aspect of the present invention is the communication method according to the first aspect of the present invention, wherein an alteration of the communication range when the inquiry message is transmitted is made by varying transmission power. By doing so, the communication range can be altered without difficulties.

The sixth aspect of the present invention is the communication method according to the first aspect of the present invention, wherein a disconnection processing is performed by selecting a communication device to be disconnected based on at least either connection time or communication data volume with respect to a communication device being connected. By doing so, the selection of the communication device to be disconnected can be made appropriately.

The seventh aspect of the present invention is a communication system in which a first communication device performs wireless communications with communication devices residing in the vicinity of the first communication device, wherein the first communication device is provided with: a wireless communication means capable of performing transmission by having communication ranges altered at a plurality of stages, a transmission control means to transmit an inquiry message from the wireless communication means by having the communication ranges altered at the plurality of stages in order to discover other communication devices residing in the vicinity, a preservation means to preserve information relating to a receiving state or frequency of receipt of response messages from the respective communication ranges for each communication device which is a sender of the received response message, when the response messages to the transmitted inquiry message are received by the wireless communication means, and a connection means to make a selection of a communication device, which becomes a connection object for wireless communications, based on the information relating to the receiving state or the frequency of receipt of the response messages preserved in the preservation means; and other communication devices residing in the vicinity of the first communication device are provided with wireless communication means and control means to transmit response messages when an inquiry message is received by the wireless communication means. By doing so, since a relationship regarding distance of the responding devices can be recognized by transmitting the inquiry message to the devices residing in the vicinity as the communication range is altered periodically, based on such information the connection is made possible with the device, for example, residing in as close vicinity as possible, so that the system enabling users to perform communications plainly and simply between devices can be constructed.

The eighth aspect of the present invention is a communication apparatus to perform wireless communication with other communication devices residing in the vicinity, comprising: a wireless communication means capable of performing transmission by having communication ranges altered at a plurality of stages; a transmission control means to transmit an inquiry message from the wireless communication means as having the communication ranges altered at the plurality of stages in order to discover other communication devices residing in the proximity; a preservation means to preserve information relating to a receiving state or frequency of receipt of response messages from the respective communication ranges for each communication device which is the sender of the received response message, when the response messages to the transmitted inquiry message are received by the wireless communication means; and a connection means to make a selection of a communication device, which becomes a connection object for wireless communications, based on the information relating to the receiving state or the frequency of receipt of the response messages preserved in the preservation means. By doing so, since a relationship regarding distance of the responding devices can be recognized by transmitting the inquiry message to the devices residing in the vicinity as the communication range is altered periodically, based on such information the connection is made possible with the device, for example, residing in as close vicinity as possible, so that the communication apparatus enabling users to perform communications plainly and simply between devices can be obtained.

The ninth aspect of the present invention is the communication apparatus according to the eighth aspect of the present invention, wherein among communication devices performing functions required by the communication device, the communication device having sent a response message transmitted to the inquiry message in the shortest communication range is selected as the connection object in the connection means. By doing so, the communication device residing in the closest vicinity can be selected automatically.

The tenth aspect of the present invention is the communication apparatus according to the eighth aspect of the present invention, wherein among communication devices performing functions required by the communication device, the communication device having sent a response message transmitted to the inquiry message in the shortest communication range is selected as the connection object in the communication means, and furthermore, as the communication device performing the function required by the communication device, a communication device having a function which has not been connected is chosen among communication devices having functions registered for a connection with the communication device. By doing so, when a plurality of communication devices reside in the closest vicinity, the device having a function which has not been connected is selected among the devices.

The eleventh aspect of the present invention is the communication apparatus according to the eighth aspect of the present invention, wherein a plurality of communication devices are almost evenly selected from the plurality of communication ranges or the frequency of receipt thereof, when a plurality of communication devices are selected at the same timing or one after another as the connection objects in the connection means. By doing so, a plurality of communication devices can be selected excellently.

The twelfth aspect of the present invention is the communication apparatus according to the eighth aspect of the present invention, wherein an alteration of the communication range of the transmission signals in the communication means, when the inquiry message is transmitted, is made by varying transmission power. By doing so, the communication range can be altered without difficulties.

The thirteenth aspect of the present invention is the communication apparatus according to the eighth aspect of the present invention, further comprising a disconnection means to perform disconnection processing by selecting a communication device to be disconnected based on at least either connection time or communication data volume with respect to a communication device being connected. By doing so, the selection of the communication device to be disconnected can be made appropriately.

BRIEF DESCRIPTION OF DRAWINGS

FIG. 3 is a block diagram showing an example of configuration of an input apparatus (mouse) as a communication device;

FIG. 4 is a block diagram showing an example of configuration of a wireless communication portion;

FIG. 10 is an explanatory diagram showing an example of a table to manage responses to an inquiry;

FIG. 11 is an explanatory diagram showing an example of a table to manage device information;

FIG. 17 is an explanatory diagram showing an example of a table describing a connection status of devices which are managed at the access point.

BEST MODE FOR CARRYING OUT THE INVENTION

Hereinafter, the first embodiment of the present invention will be explained by referring to FIGS. 1 through 13. In this embodiment, the present invention is applied to a device in which an communication apparatus to perform the Bluetooth wireless communications, which is one of relatively short-range wireless communication methods, is incorporated.

In this embodiment, the present invention is applied to a personal computer apparatus and an input apparatus of a pointing device performing input into the personal computer apparatus. Hereupon, an input apparatus called a mouse (hereinafter referred to as a mouse) is employed as the above input apparatus.

Figure 1:
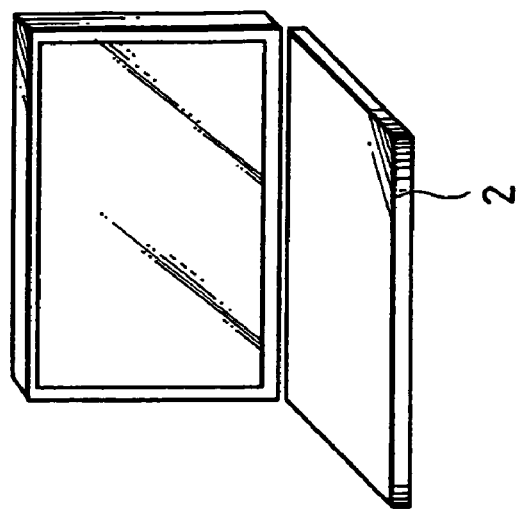
FIG. 1 is a constitutional diagram showing an example of system configuration according to the first embodiment of the present invention.
Figure 1:
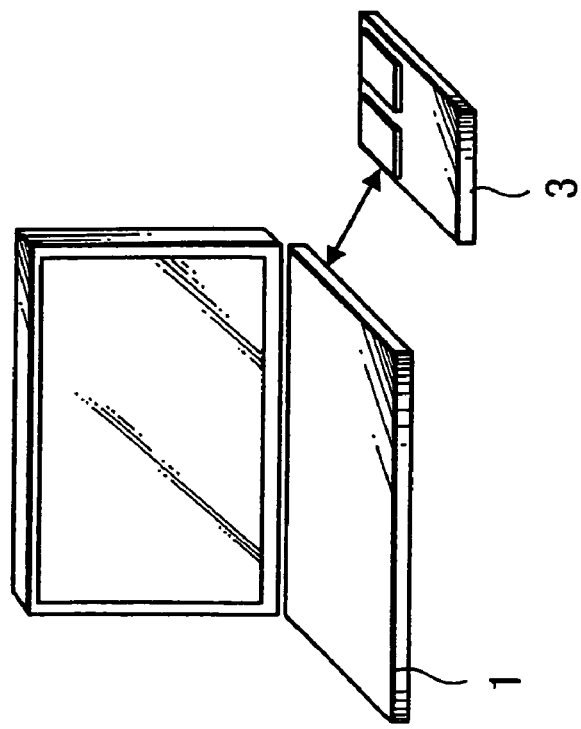

FIG. 1 is a diagram showing an example of configuration of a communication system according to the embodiment. Hereupon, two sets of computer apparatuses 1 and 2 are provided and a mouse 3, which can be utilized as an input apparatus to the computer apparatuses 1 and 2, is provided.

The computer apparatuses 1, 2 and the mouse 3 are devices capable of respectively performing wireless communications based on the Bluetooth wireless communication method, and data can be transmitted and received among the devices. In the example shown in FIG. 1, it is assumed that the computer apparatus 1 and the mouse 3 are in a state of residing in the close vicinity, for example, within 10 centimeters, and on the other hand, the computer apparatus 2 is in a state of residing far from the computer apparatus 1 and the mouse 3, for example, several meters away. When the computer apparatus 1 and the mouse 3 are connected through wireless communications to be communicable, a user can operate the computer apparatus 1 by manipulating the mouse 3 in the same way as an ordinary mouse which is conventionally connected by wiring.

Figure 2:
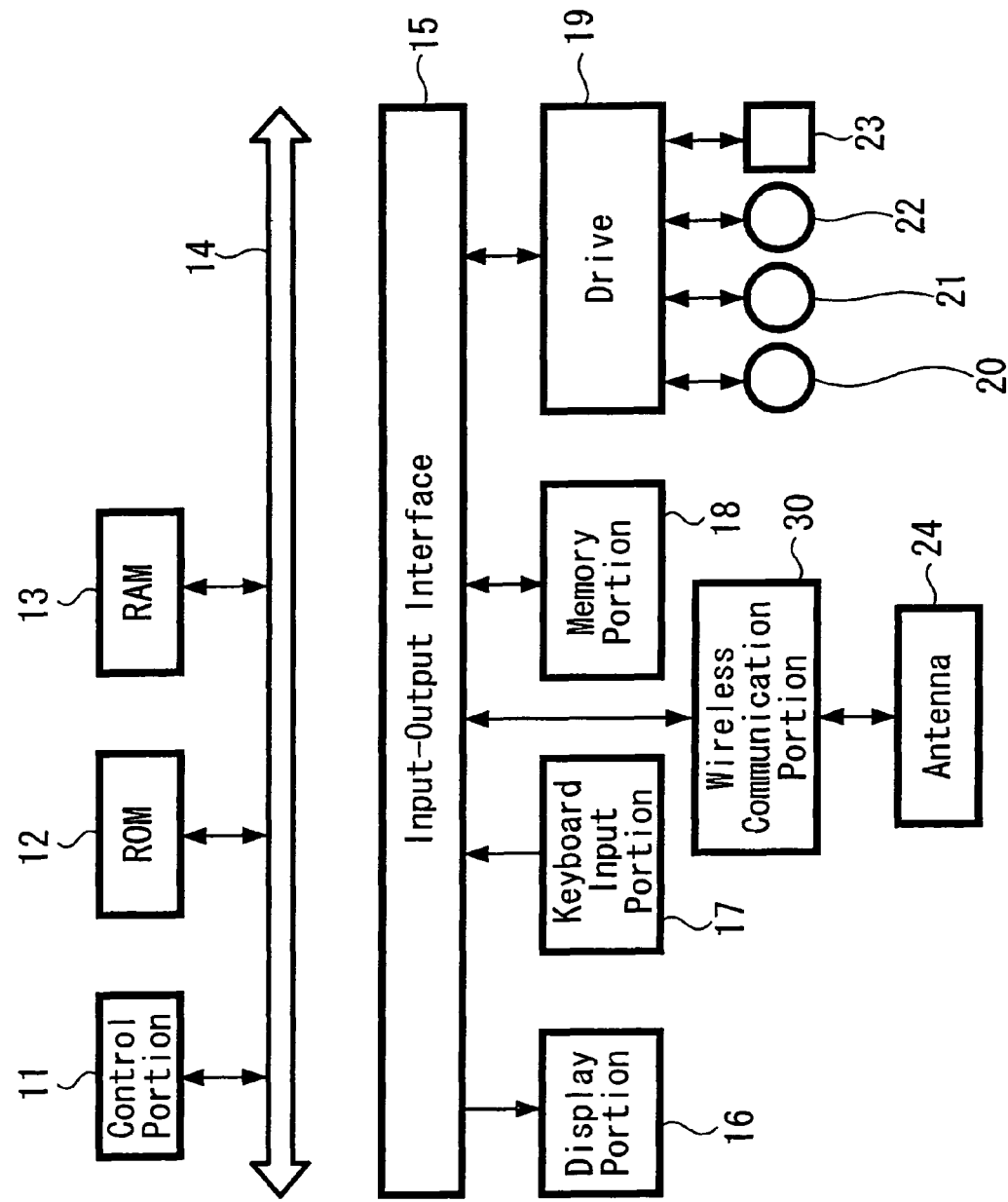
FIG. 2 is a block diagram showing an example of configuration of a personal computer apparatus as a communication device.

FIG. 2 is a block diagram showing an internal configuration of the computer apparatuses 1 and 2 according to the embodiment. A control portion 11 is composed of a central processing unit (CPU) or the like and controls the whole computer apparatus 1 by performing various sets of control processing in accordance with programs stored in a memory portion 18, which is composed of a ROM 12, a hard disc or the like, and various memory media attached to a drive 19, which are a magnetic disc 20, an optical disc 21, an optical-magnetic disc 22 and a semiconductor memory 23. Also, programs to be used by the control portion 11 and temporary data during processing or the like are stored in a RAM 13, when it is necessary.

The control portion 11, ROM 12, RAM 13 and an input-output interface 15 are mutually connected via a bus line 14, and furthermore, not only a display portion 16 but also a keyboard input portion 17, the memory portion 18, the drive 19 and a wireless communication portion 30 are connected to the input-output interface 15.

The display portion 16 is composed of, for example, a liquid crystal display panel and a drive circuit thereof and is made to indicate various pieces of information to a user based on the instruction from the control portion 11. The keyboard input portion 17 is a part for a user to perform an input operation and operational signals thereof are sent to the control portion 11.

The memory portion 18 is composed mainly of a hard disc or the like and provides various programs and data for the control portion 11. In addition, data are also provided from various memory media connected to the drive 19, and furthermore, programs or data may be received from other devices connected via any arbitrary communication line, and also, a memory portion 18 of another device connected via any communication line may as well be utilized as its own memory portion 28. The various memory media connected to the drive 19 may be fixed or may be freely detachable as well.

The wireless communication portion 30 is composed of a control circuit or the like to control the Bluetooth wireless communications, and an antenna 24 to transmit and receive radio signals is connected thereto. A communicable range in which wireless communication can be performed by the wireless communication portion 30 is predetermined by the transmission power and the structure of the antenna 24 or the like, and it is set within the range of 10 meters to 100 meters in the Bluetooth wireless communication. Although it is explained in this embodiment that the wireless communication portion 30 has the communicable range of approximately 10 meters at maximum, it may undoubtedly be any arbitrary distance as well. Also, on viewing from the wireless communication portion 30, parts being controlled by the control portion 11 are called hosts in the following explanation.

FIG. 3 is a block diagram showing an internal configuration of the mouse 3. An explanation for the configuration thereof is that a control portion 51 is composed of a LSI or the like and controls the whole mouse 3 by performing various sets of control processing in accordance with programs stored in a ROM 52. Also, programs to be used by the control portion 51 or temporary data in processing are stored in a RAM 53, when it is necessary.

A position input portion 54 is a part to detect an operation performed by a user and, for example, by providing a spherical drive member on a contacting surface so that a displacement can be detected from a rotational movement thereof or by optically measuring a movement over the contacting surface; and thus the movement is detected and information thereof is sent to the control portion 51.

A button input portion 55 is composed of some buttons and, furthermore, wheels or the like capable of rotating upward and downward, and its signals are sent to the control portion 51. Though two buttons are provided therein as an example in this embodiment, it may undoubtedly be composed of a plurality of buttons or wheels as well. A wireless communication portion 60 is composed of a control circuit or the like to control the Bluetooth wireless communications, and furthermore an antenna 57 is connected thereto. The basic internal configuration of the wireless communication portion 60 is the same as the wireless communication portion 30 provided in the computer apparatus 1 or the like shown in FIG. 2. The control portion 51, the ROM 52, the RAM 53, the position input portion 54, the button input portion 55 and the wireless communication portion 60 are mutually connected via a bus line 56 and the control portion 51 is made to control the whole mouse 1.

FIG. 4 is a block diagram showing an example of configuration for the wireless communication portion 30 provided in the computer apparatuses 1 and 2, and for the wireless communication portion 60 of the mouse 3. Though the wireless communication portion 30 of the computer apparatus shown in FIG. 2 is explained as an example in the following explanation, regarding the wireless communication portion 60 shown in FIG. 3, the configuration itself is the same.

A control portion 61 provides control programs stored in a ROM 62 to a RAM 63 and controls operations of the whole wireless communication portion 30. Temporary data or the like are also stored in the RAM 63.

In a flush memory 64, for example, a device address which is unique to a Bluetooth wireless communication device and a link key or the like, which is a common key to be used at the time of authorization for an individual Bluetooth communication device are stored and supplied to the control portion 61 as necessity arises.

An input-output interface 65 is an interface to exchange data and commands with the host side and is called a host controller interface in the Bluetooth communication. The input-output interface 65 supplies data or commands, which are supplied via the input-output interface 15 on the host side, to the control portion 61 or a base-band control portion 66, and on the contrary, supplies data from the control portion 61 or the base-band control portion 66 to the control portion 11 on the host side via the input-output interface 15.

The base-band control portion 66 sends data supplied from the input-output interface 65 to a transceiver 67 in order to wirelessly transmit. In addition, the base-band control portion 66 digitalizes signals supplied from the transceiver 67 and supplies the digitized signals to the host side via the input-output interface 65. Herein, various controls for a link, a packet, a logical channel, a security and the like in addition to processing such as error correction coding, multiplexing and randomization of data are performed.

The transceiver 67 performs frequency-hopping modulation on digital data supplied from the base-band control portion 66, effects an electrical power control, and then, wirelessly transmits the data via the antenna 24. Also, after correlating data received via the antenna 24 with generated frequency hopping signals, eliminating jamming wave components by a filter and performing FSK demodulation on data, the digital data are supplied to the base-band control portion 66.

Next, processing in this embodiment is explained. Hereupon, the computer apparatus 1, 2 and the mouse 3 in this embodiment are assumed to have transmission output power capable of performing wireless communications within a radius range of 10 meters at a normal time.

Figure 5:
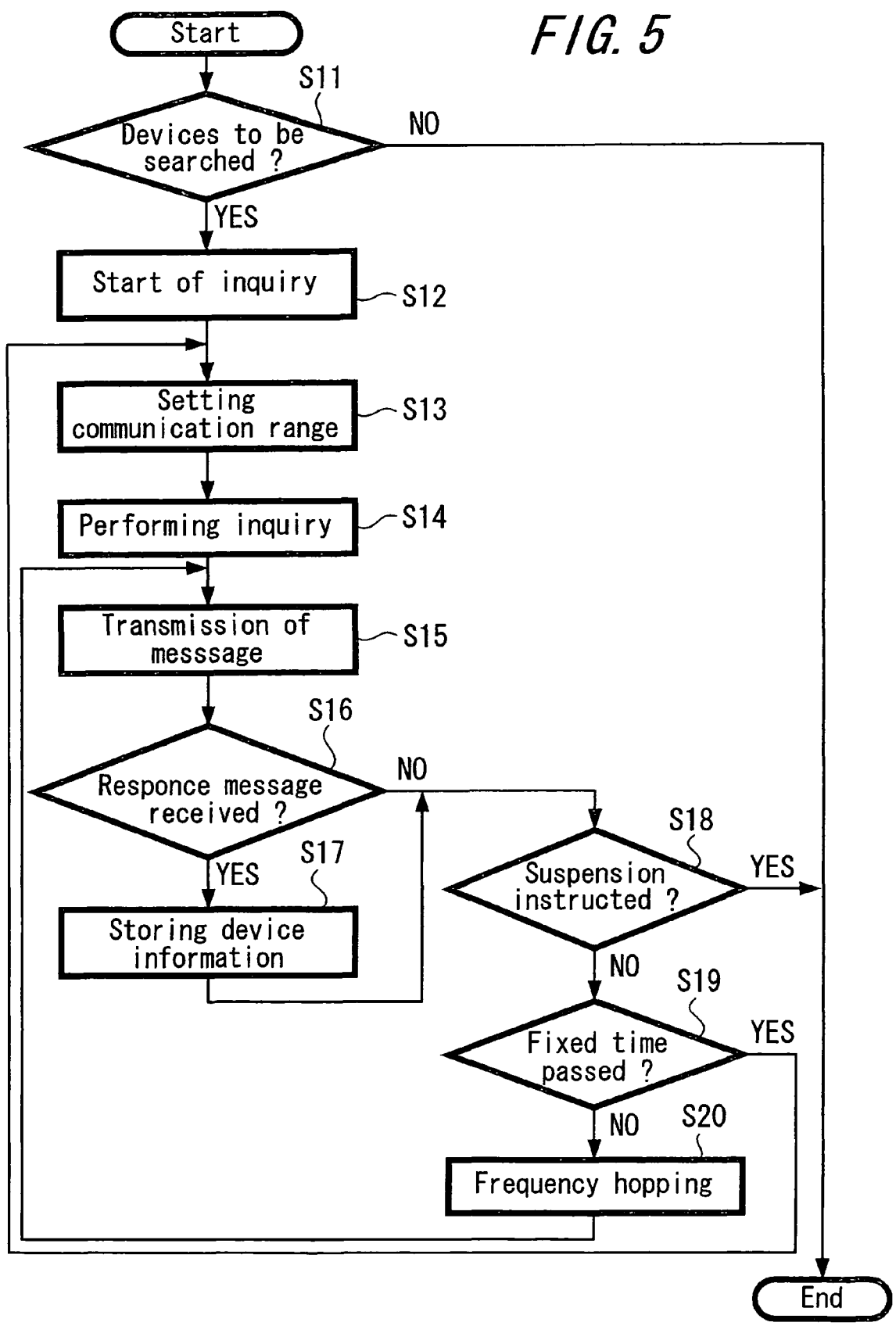
FIG. 5 is a flow chart showing an example of an inquiry procedure on a computer apparatus side.

FIG. 5 is a flow chart showing processing in the computer apparatus 1 in detail. Hereupon, though explanation is made on the computer apparatus 1 as an example, another computer apparatus 2 may be employed to perform the same processing as well.

Figures 6, 7:
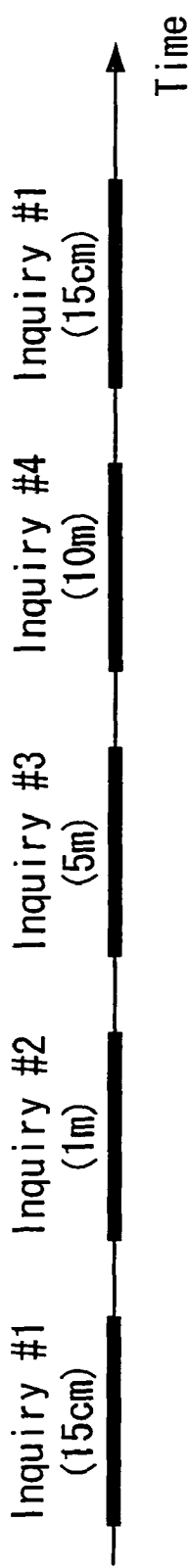
FIG. 6 is an explanatory diagram showing an example of a table describing a connection status of peripheral devices which are managed by a computer apparatus.
FIG. 7 is a time chart showing an example of an operation of inquiry processing periodically performed.

Referring to the flow chart in FIG. 5, explanation will be made as follows; the computer apparatus 1 makes a judgment based on the present status whether devices are to be searched for (Step S11). In this embodiment, the computer apparatuses 1 and 2 continuously monitor peripheral devices being connected respectively and the RAM 23 preserves information relating to a connection state of the peripheral devices required by the computer apparatus 1, for example, as shown in FIG. 6. The connection herein mentioned includes not only a case where connection is made to perform wireless communications such as the Bluetooth communication but also a case where connection is made through wiring by using a USB (Universal Serial Bus) method or the like.

In the example shown in FIG. 6, a mouse and a headphone, both of which are examples of input apparatuses, are not in a state of being connected at present and it is recognized that a keyboard or the like is being connected. Based on this information, the computer apparatus 1 starts a processing of periodically transmitting an inquiry message querying whether there are a connectable mouse and a headphone residing in the vicinity (Step S12). Herein, though the computer apparatus 1 is made to start the processing automatically, it may undoubtedly be made to start the processing based on a explicit instruction by a user as well.

The control portion 11 sends to the wireless communication portion 30 a command to set appropriate transmission power so that a message can be transmitted only within a designated communication range. The wireless communication portion 30 sets to adjust the transmission power in the transceiver 67 in accordance with information relating to the transmission power stored beforehand in the ROM 62 or the flush memory 63. After completion of the setting, the response thereof is provided for the control portion 11 via the input-output interface 65 (Step S13).

Successively, the control portion 11 sends to the wireless communication portion 30 a command to transmit an inquiry message (Step S14). In the command, a maximum number of devices to be discovered by the inquiry message and a period of transmitting the inquiry message can be provided as parameters, and it is specified in this embodiment that approximately 10 seconds is set as the period to be able to collect an ample number of responses from devices residing in the vicinity and no limitation is set as a maximum number of devices to be discovered; however, undoubtedly they may be set arbitrarily.

The wireless communication portion 30 generates an inquiry message in the base-band control portion 66 in accordance with a command issued from the host side via the input-output interface 65 and transmits the inquiry message via the transceiver 67 and the antenna 24 (Step S15). Further, at this time, the transmission power is controlled in accordance with the information relating to the transmission power stored in the ROM 62 or the flush memory 63, thereby transmitting the inquiry message only to the designated distance.

After transmitting the inquiry message, the wireless communication portion 30 awaits response messages from other devices in response to the inquiry message (Step S16). If the mouse 3 is in a standby mode for an inquiry message (a state of step S23 in the flow chart of FIG. 12), which is explained hereinafter, and is set to receive an inquiry message at the same timing and in the same frequency, the wireless communication portion 60 of the mouse 3 transmits a response message to the inquiry message via the antenna 57 (refer to step S24 in FIG. 12) and the wireless communication portion 30 of the computer apparatus 1 can receive the response message via the antenna 24. The response message having been received by the computer apparatus 1 includes an ID (Bluetooth device address) which is unequivocally distinguishable and unique to the mouse 3 and the obtained ID information is supplied to the host side via the input-output interface 65 (Step S17). As is explained hereinafter, the information having been obtained is stored in the RAM 13 and the memory portion 18 or the like as shown in FIGS. 10 and 11.

When a response message from other devices can not be received, firstly, if it is instructed by a user or the control portion 11 to suspend the inquiry, the control portion 11 gives to the wireless communication portion 30 a command to suspend inquiry processing and then, the wireless communication portion 30 suspends the inquiry processing (Step S18) and ends transmission processing of the inquiry message. Further, if a certain predetermined time has already passed, the wireless communication portion 30 suspends the inquiry processing (Step S19), returns to the step S13, and again sets a communication range.

If the processing is not suspended at the steps S18 and S19, the wireless communication portion 30 alters a frequency to transmit the message (Step S20) and successively, repeats the transmission processing of the inquiry message.

When the processing of the step S13 is performed again, the communication range is made to be altered periodically, so that the control portion 11 sends to the wireless communication portion 30 a command to set an appropriate communication range.

FIG. 7 is a diagram showing an aspect of transmitting inquiry messages by the computer apparatus 1 according to this embodiment. Hereupon, firstly, an inquiry #1 is performed for a certain period upon setting a communication range to approximately 15 cm at the step S13 in the flow chart of FIG. 5. Further, after a certain period has passed, an inquiry #2 is performed upon setting the communication range to approximately 1 m. Thereafter, inquiries #3 and #4 are performed in the same manner by having the communication ranges altered to approximately 5 m and approximately 10 m respectively, and when the maximum transmission output power is reached, the periodical transmission of the inquiry message is repeatedly performed by returning to the shortest communication range. The communication ranges and the time intervals or the like are set in accordance with information stored in the RAM 13, the memory portion 18 and various memory media connected to the drive 19.

Figure 8:
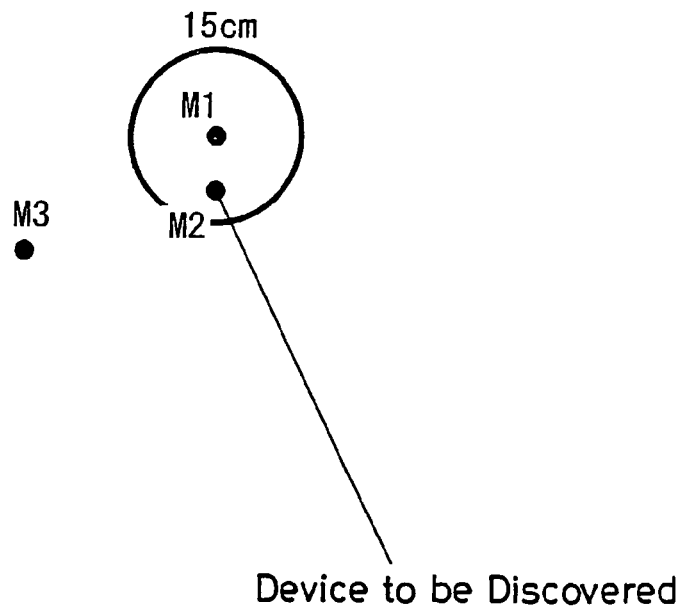
FIG. 8 is an explanatory diagram showing an example of inquiry processing performed in the range of 15 cm communication radius.
Figure 9:
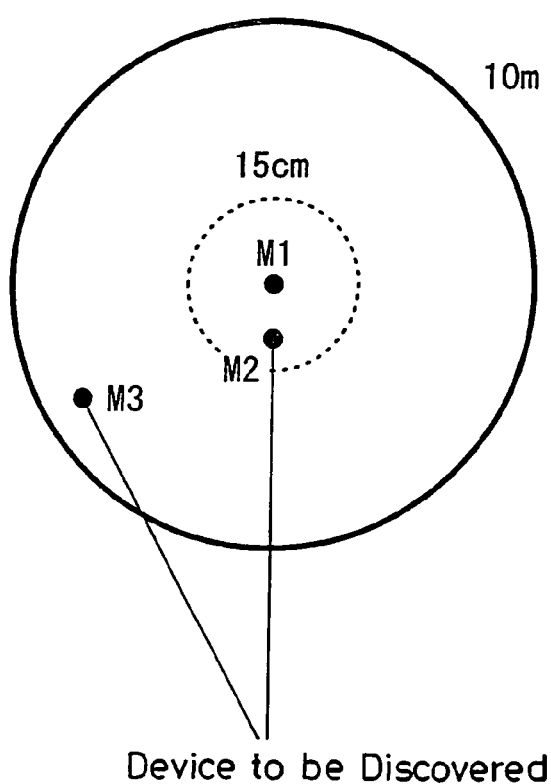
FIG. 9 is an explanatory diagram showing an example of inquiry processing performed in the range of 10 cm communication radius.

FIGS. 8 and 9 schematically show an example in which the computer apparatus 1 transmits an inquiry message according to the flow chart in FIG. 5. The aspect of the inquiry by the computer apparatus 1 is explained with reference to FIGS. 8 and 9, wherein spots M1, M2 and M3 shown in FIGS. 8 and 9 indicate respective locations of communication devices having the standard to perform the Bluetooth communication. Herein, the device M1 in the center indicates the computer apparatus 1, the device M2 indicates the mouse 3, the device M3 indicates the computer apparatus 2, and all of them are assumed to be in a standby mode so as to be able to respond to an inquiry message. In this embodiment, it is assumed that the device M2 (mouse 3) is within a range of 15 cm from the device M1 (computer apparatus 1) and the device M3 (computer apparatus 2) is several meters (within 10 meters) away from the device M1.

When the device M1 (computer apparatus 1) transmits an inquiry message in the above state, devices in a standby mode so as to respond to an inquiry message from another device transmit response messages to the computer apparatus 1 which have sent the inquiry message, after the inquiry message is received.

FIG. 8 is a diagram schematically showing an aspect when the computer apparatus 1 performs the inquiry #1 shown in FIG. 7, whereupon the computer apparatus 1 receives a response message from a device, which resides within the range of 15 centimeters from the computer apparatus 1 and also is in the standby mode so as to be able to respond to an inquiry message, that is, the device M2 (mouse 3). The device M3 can not receive the inquiry message, since it is beyond the reaching range of the inquiry message.

FIG. 9 is a diagram schematically showing an aspect when the computer apparatus 1 performs the inquiry #4 shown in FIG. 7, whereupon the computer apparatus 1 receives response messages from devices which reside within the range of 10 m from the computer apparatus 1 and also are in the standby mode so as to be able to respond to an inquiry message, which are the devices M2 and M3.

As the example shown in FIG. 7 by periodically repeating the processing shown in FIG. 5, the computer apparatus 1 can obtain such information as that shown in FIGS. 10 and 11 and those sets of information are preserved in the RAM 13 and the memory portion 18.

Information shown in FIG. 10 is an example of a table for managing responses to an inquiry. The information indicates that, for example, the time of the inquiry, a communication range then being set and a list of device numbers having responded to the inquiry are preserved with respect to the inquiry. The device number herein is a number given uniquely by the computer apparatus 1 in order to manage an individual device. A correlation between the above device number and a device address uniquely given to each device (Bluetooth device address in case of the Bluetooth communication) is preserved as a device information management table shown in FIG. 11. Also, a device class information indicating what kind of function the device has and what services are provided (that is called a device class and a service class respectively in case of the Bluetooth communication) is included in a response message to an inquiry as the information in the device information management table. These data of information are expressed as a row of bits, for example, as shown in FIG. 11 and each bit is made to have a specific meaning respectively. A device can be judged from the above device class information whether it is a device having a function (for example, a mouse or the like) required by the computer apparatus.

Figure 12:
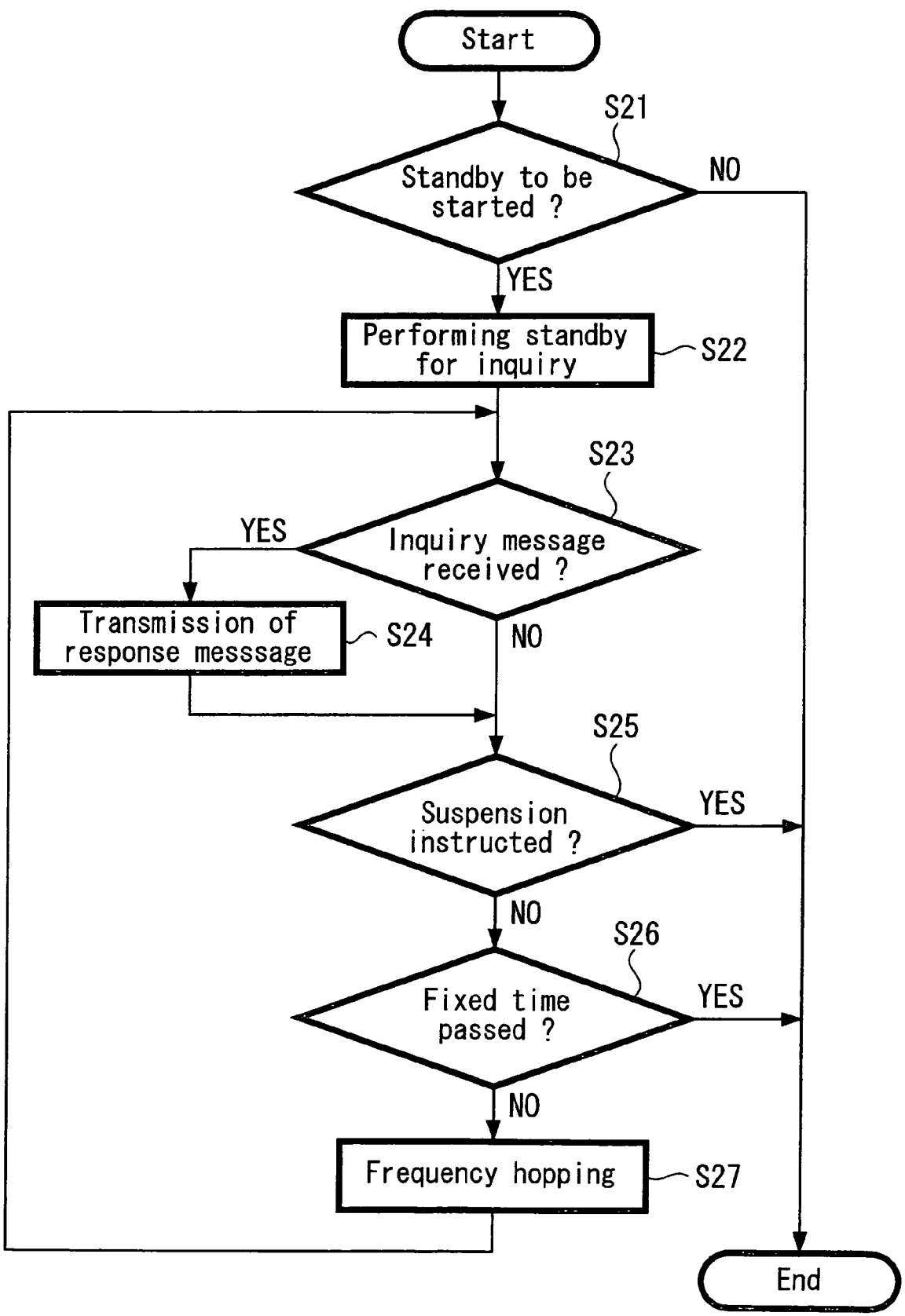
FIG. 12 is a flow chart showing an example of a standby procedure for an inquiry in an input apparatus.

Next, a standby procedure for an inquiry message on the side of the mouse 3 is explained referring to the flow chart in FIG. 12. Firstly, the mouse 3 judges based on the present status whether the standby processing shall be started (Step S21). The above judgment can be made, for example, based on whether a connection has been already established in the control portion 51, based on a present remaining amount of battery power or the like.

When the judgment is made to stand by, the control portion 51 sends to the wireless communication portion 56 a command to respond to an inquiry message. The wireless communication portion 56 stands by for an inquiry message from another device at predetermined periodical intervals and in a certain frequency (Step S22).

If an inquiry message is received from another device (Step S23), the wireless communication portion 60 transmits to the device a response message responding to the inquiry message (Step S24).

Successively, the control portion 51 confirms whether an instruction to suspend the standby processing is being given by a user or the control portion 51 and gives a command to suspend the standby processing to the wireless communication portion 60, if the suspension is being instructed, and then, the wireless communication portion 60 suspends the standby processing (Step S25) and ends the standby processing for an inquiry message. For example, when a connection is established by another device during the standby processing, the control portion 51 can give a command to suspend the standby processing being presently performed. Furthermore, if a predetermined period which is determined in advance has passed, the wireless communication portion 56 suspends the standby processing (Step S26) and ends the standby processing for an inquiry message. For example, the standby processing can be performed at appropriate time intervals so as not to consume electrical power excessively.

If the processing is not suspended at the steps S25 and S26, the wireless communication portion 60 alters a standby frequency (Step S27) and successively repeats the standby processing for an inquiry message.

As described above, in a connectable state the mouse 3 is made to be capable of appropriately responding to an inquiry message.

Figure 13:
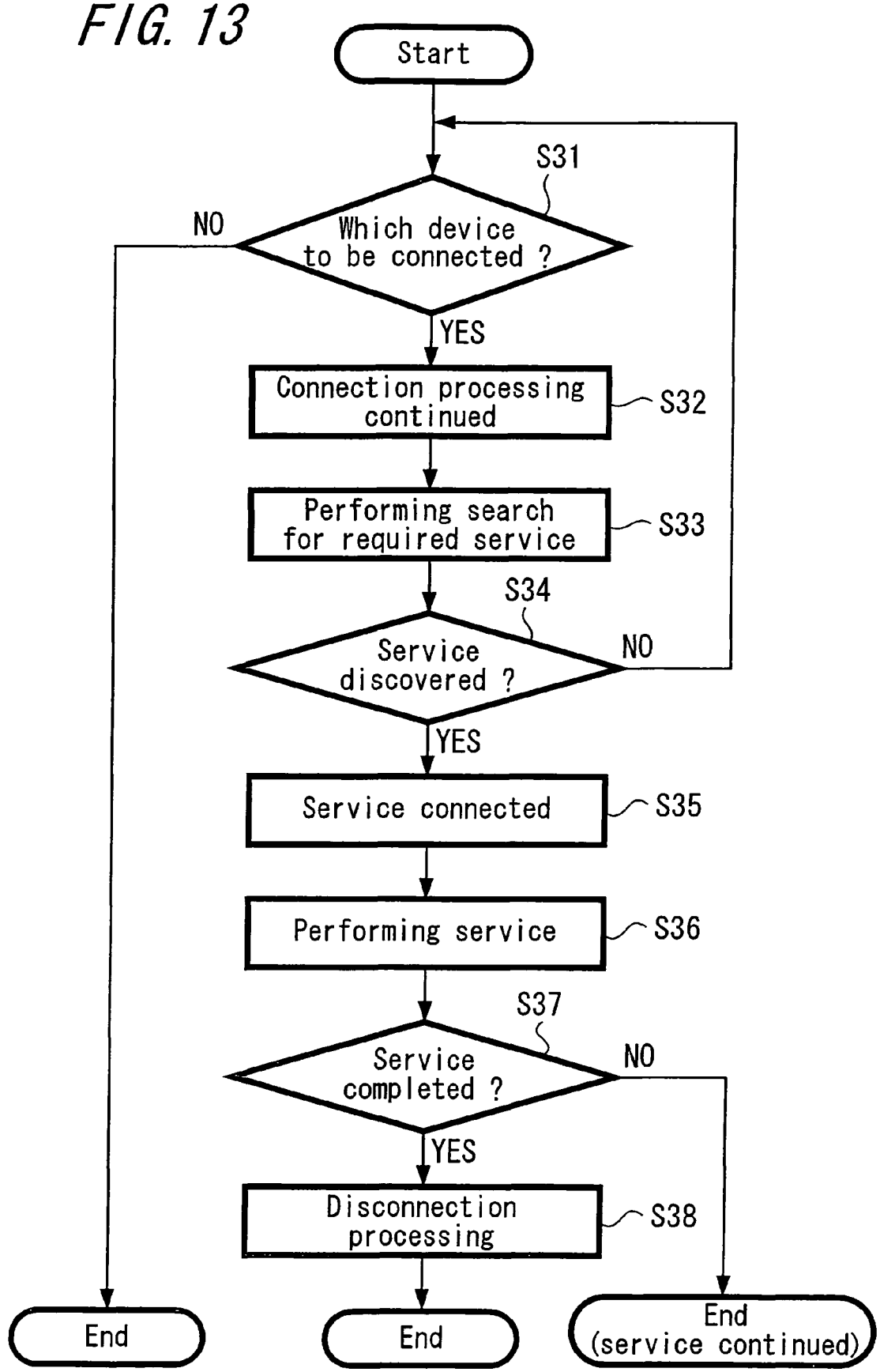
FIG. 13 is a flow chart showing an example of a procedure for a connection processing in a computer apparatus.

Thus, by following the procedure shown in the flow chart of FIG. 5, the computer apparatus 1 can obtain information relating to devices residing in the vicinity of the computer apparatus 1 as shown in FIGS. 10 and 11. Based on the information, the computer apparatus 1 further can select a device to be connected and perform a connection processing. A flow chart describing a procedure for the selection and connection is shown in FIG. 13.

Firstly, the control portion 11 of the computer apparatus 1 judges whether there is a device to be connected based on the information in each table shown in FIGS. 6, 10 and 11 which is stored in the RAM 13 and the memory portion 18 (Step S31). Herein, it can be detected that a mouse and a headphone are in a state of not being connected according to the information shown in FIG. 6 and also a device of a device number 1 provides a function as an input apparatus according to the information shown in FIG. 11, and furthermore, it can be judged that at present the device still resides within 15 cm according to FIG. 12.

Further, when it is judged that a plurality of devices which can be selected reside at the same time and within almost same distance, a device having been connected most recently may, for example, be selected or a query may be made to urge a user to make a selection.

As stated above, if there is a device to be connected by the computer apparatus 1 and it can be confirmed that the connectable device still resides at present in the close vicinity, the control portion 11 performs the connection processing to the device address, which is an ID unique to the mouse 3 stored in the RAM 13 and the memory portion 18, by the wireless communication portion 30 (Step S32). In this connection processing, there is a case where a connection authorization processing is required to perform the Bluetooth communication depending on setting of respective devices and the connection authorization is executed by an input of identification information called a passkey.

After the connection between the computer apparatus 1 and the mouse 3 is established, the computer apparatus 1 conducts a search in accordance with a predetermined protocol (called a service discovery protocol. Refer to the Bluetooth standard as to the details) whether the mouse 3 provides required services. The search is done by transmitting to the mouse 3 a service inquiry message which includes a unique ID (Service UUID) indicating a specific service and by transmitting from the mouse 3 a response message to the inquiry message (Step S33). In this embodiment, it is made to search for an ID indicating that a function of a mouse, which is one of input apparatuses, is provided. Control information thereof is stored in the ROM 12, the RAM 13, the memory portion 18 or memory media being connected to the drive 19.

On the other hand, when the mouse 3 is not connected to any device, it is normally in a standby mode so as to be able to respond to a service for which the function of the mouse is provided. Control information thereof is also stored in the ROM 52 and the RAM 53 of the mouse 3.

Further, if it is discovered at the step S34 of the flow chart in FIG. 13 that the mouse 3 can provide a required service, the computer apparatus 1 requests the mouse 3 to connect to the required service (Step S35). In the connection processing thereof, there is a case where the connection authorization processing is required to perform the Bluetooth communication depending on the setting of the respective devices. This connection authorization is executed normally by inputting the identification information called the passkey and also by conducting a query to a user for confirmation of the connection permission.

Also, if it is discovered at the step S34 of FIG. 13 that the mouse 3 does not provide the required service, the processing is again returned to the step S31, and if there is a device other than the mouse 3 which satisfies the condition, the same connection processing is performed on the device. After the service connection is established, the computer apparatus 1 executes an appropriate service procedure depending on a state of a program being executed at present (Step S36). In this embodiment, the service is performed so that the mouse 3 can act as a mouse of the computer apparatus 1. The mouse 3 is made to transmit wirelessly input information from the position input portion 54 and the button input portion 55 to the computer apparatus 1 via the wireless communication portion 60 and the antenna 57.

If the required service is such a service that does not need to continuously maintain wireless communications thereafter, the control portion 11 gives to the wireless communication portion 30 an instruction to disconnect the communication (Step S38). Also, if it is a service which needs to maintain wireless communications, the service is kept continued without a disconnection (Step 39). As an example of the former one, there is, for example, a case where wireless communications are used for transferring video data information and as an example of the latter one, there is a case of an input apparatus of, for example, this embodiment, or a case where a communication path for, dial-up communications, IP network communications or the like is provided. Control information thereof is also stored in the ROM 12, the RAM 13, the memory portion 18 and memory media connected to the drive 19 of the computer apparatus 1.

As described above, the computer apparatus 1 can discover a mouse residing in closer vicinity by having the communication ranges periodically altered in the plurality of stages, can establish automatically a connection to perform wireless communications, and can perform the required service.

Further, in the embodiment heretofore explained, though the computer apparatus 1 periodically performs an inquiry to recognize devices residing in the vicinity of the computer apparatus 1, it is similarly effective even if it is performed in the other way around. For example, it is also possible that the mouse 3 periodically performs an inquiry, discovers a computer apparatus residing in closer vicinity which needs a mouse, and controls so as to establish a connection to the computer apparatus. Furthermore, the mouse may perform periodically both an inquiry processing and a standby processing.

Next, the second embodiment of the present invention is explained referring to FIGS. 14 through 17. Further, in this second embodiment, portions that have the same configurations and processing as those explained in the first embodiment shall be explained by quoting the drawings referred to in the first embodiment.

Figure 14:
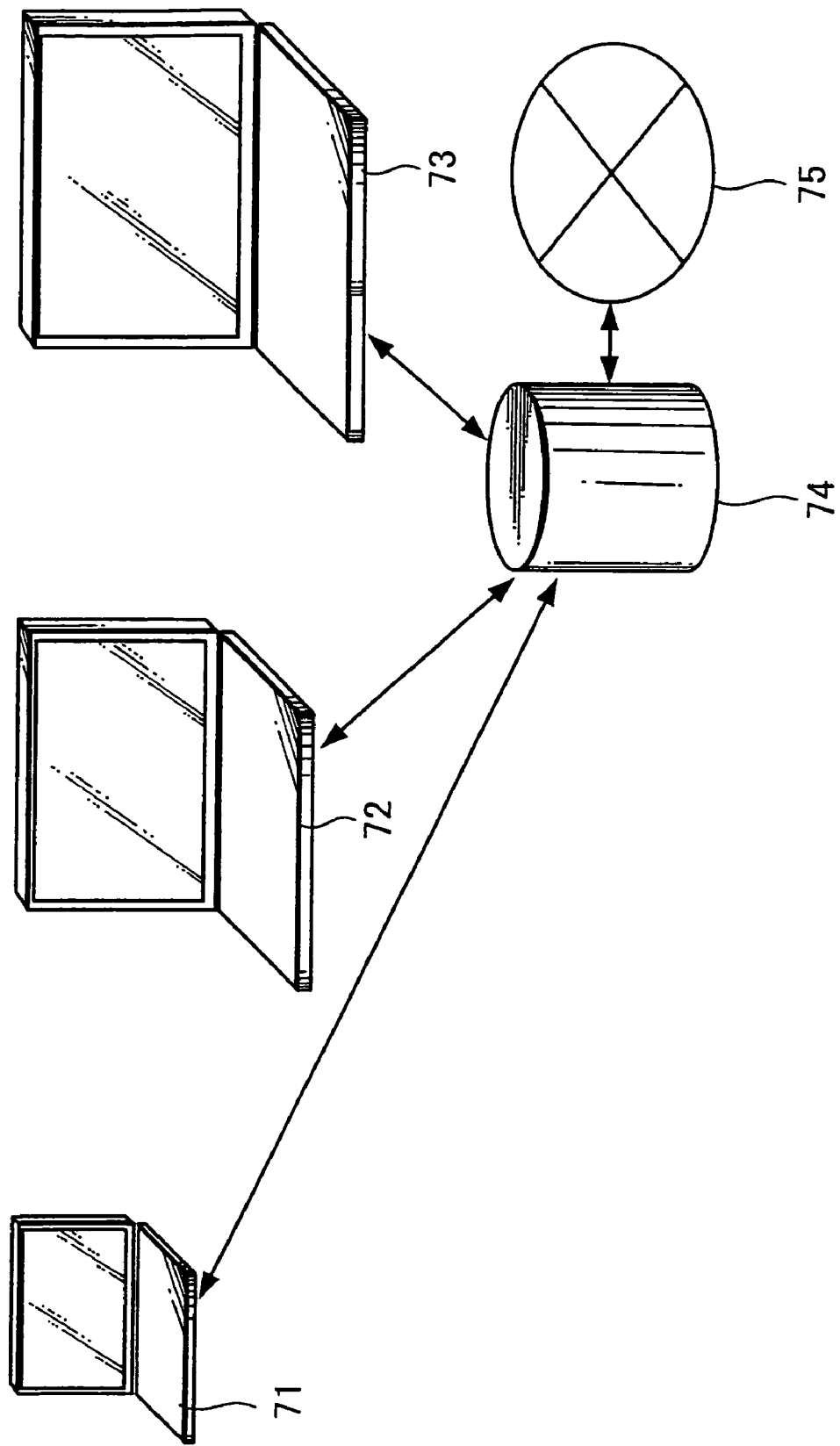
FIG. 14 is a constitutional diagram showing an example of system configuration according to the second embodiment of the present invention.

In the second embodiment, as shown in FIG. 14 the present invention is applied to a system, in which a plurality of personal computer apparatuses 71, 72 and 73 are provided to be able to access an internet 75 via an access point 74. Hereupon, data transmission between the access point 74 and each of the computer apparatuses 71, 72 and 73 is made to be performed by the Bluetooth wireless communication.

Each of the computer apparatuses 71, 72 and 73 is assumed to have transmission output power capable of performing wireless communications, for example, within a range of 10 meters at an ordinary time. In the example shown in FIG. 14, it is assumed that the respective computer apparatuses exist in the order of 73, 72 and 71 with respect to the distance from the access point 74; for example, approximately 50 cm between the access point 74 and the computer apparatus 73; within approximately 4 m between the access point 74 and the computer apparatus 72; and approximately 9 m between the access point 74 and the computer apparatus 71. The access point 74 is further connected to the internet 75 as an outside network, and when the computer apparatuses 71, 72 and 73 are connected to the access point 74 so as to perform wireless communications, communications thereof with the internet 75 or among respective computer apparatuses can be performed via the access point 74.

The internal configuration of each computer apparatus 71, 72 and 73 is the same as that of the computer apparatus 1 which is explained in the first embodiment (in other words, the configuration shown in FIG. 2) and here the explanation thereof is omitted.

Figure 15:
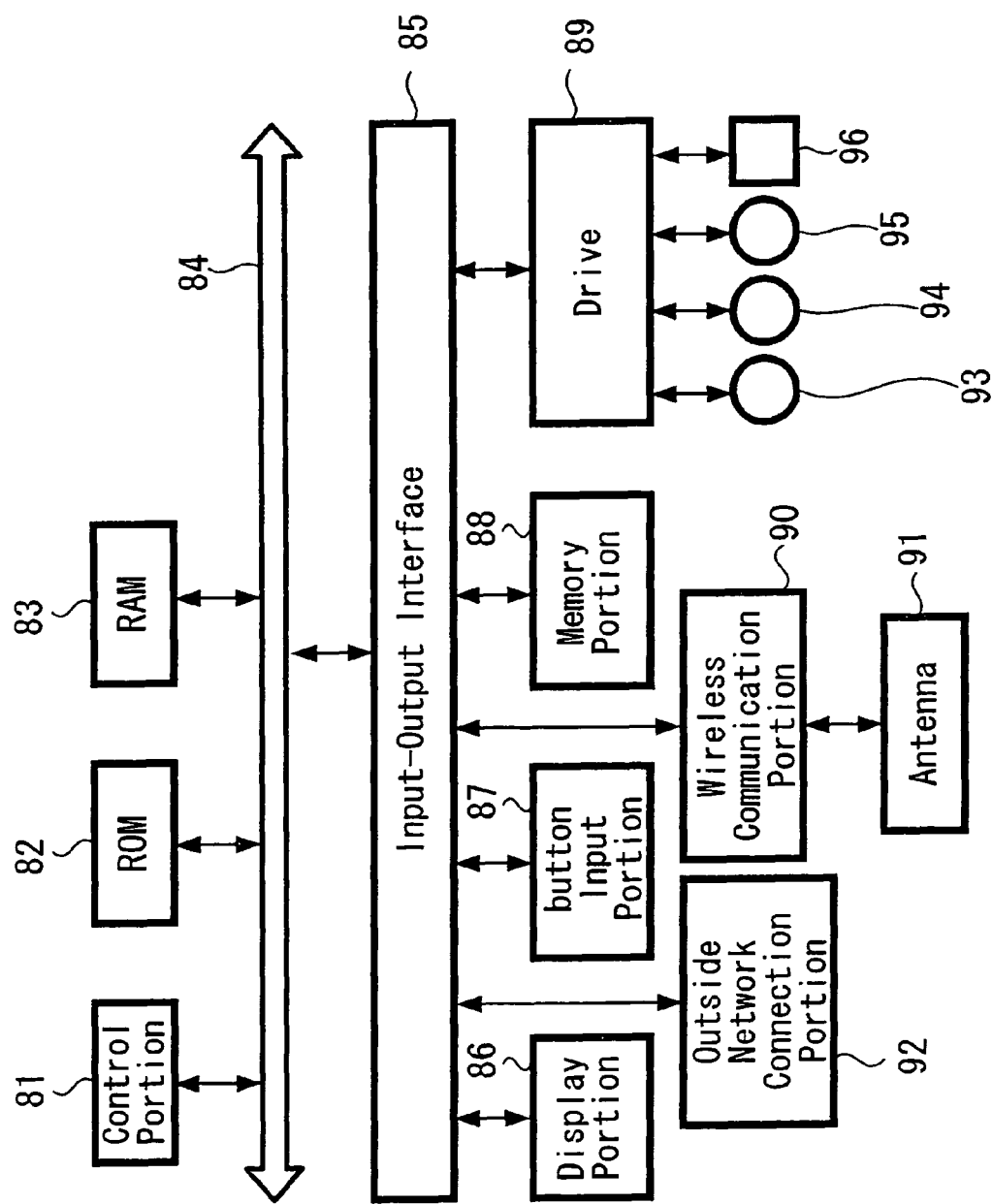
FIG. 15 is a block diagram showing an example of configuration of an access point.

FIG. 15 is a block diagram showing an internal configuration of the access point 74. Basic configuration is the same as that of the computer apparatus 1 and explanations shall be given regarding differences from the computer apparatus 1. An outside network connection portion 92 is a part transmitting and receiving data between the internet 75 and may be connected to an outside network by establishing a connection with the public telephone line, for example, via a modem or may be connected as well to a corporate LAN (Local Area Network) or to a domestic LAN via a predetermined network (by wire or wirelessly).

A control portion 81 is made to control transmission and receipt of data among devices connected via a wireless communication portion 90 and among devices connected via the outside network connection portion. The configuration of the wireless communication portion 90 is the same as that shown in FIG. 3 which is already explained in the first embodiment. Further, in case of the Bluetooth communication, up to seven devices can conventionally be connected to one wireless communication portion and it is assumed that the access point 74 is also capable of simultaneously connecting up to seven devices.

Next, a connection processing of the computer apparatuses 71, 72 and 73 controlled by the access point 74 is explained in the system configuration of this embodiment. The access point 74 performs an inquiry to discover devices residing in the vicinity in accordance with the procedure shown in the flow chart of FIG. 5 which is already explained in the first embodiment. The details of FIG. 5 are as heretofore explained, and according to the procedure the access point 74 periodically obtains device information such as those shown in FIGS. 10 and 11 as the information relating to devices residing in the vicinity, and stores in a RAM 83 or a memory portion 88.

On the other hands, the computer apparatus 71, 72 and 73, which are devices residing in the vicinity, can stand by for an inquiry in accordance with the procedure shown in the flow chart of FIG. 12 which is explained already.

Figure 16:
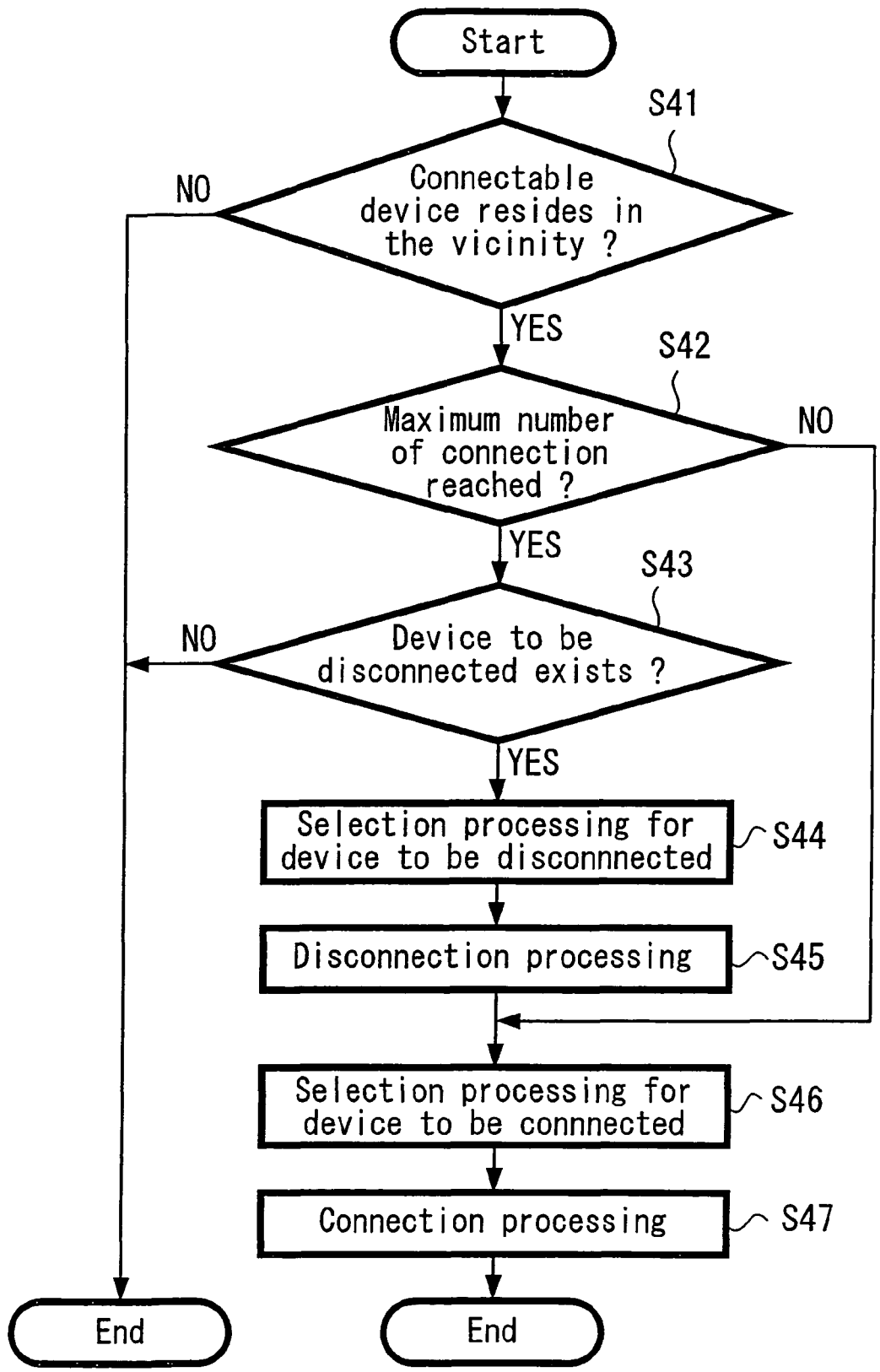
FIG. 16 is a flow chart showing an example of a procedure for a disconnection and connection processing at the access point.

Also, the access point 74 is further made to be capable of connecting to an appropriate device in accordance with the procedure shown in the flow chart of FIG. 16. Firstly, the control portion 81 judges whether connectable devices reside in the vicinity in accordance with the procedure shown in the flow chart of FIG. 5 which is already explained and based on information sets such as those shown in FIGS. 10 and 11, which are periodically obtained and stored in the RAM 83 or the memory portion 88 (Step S41). The above judgment is possible by conducting a search or the like based on FIGS. 10 and 11 whether there is a device having a function of accessing a network among those devices having responded to an inquiry, for example, during the last several minutes. A rule for the judgment may be stored beforehand in the ROM 82 or may be provided for the RAM 83 or the memory portion 88 via various memory media connected to a drive 89. Furthermore, it may be possible as well to enable a user to set via a display portion 86 and a button input portion 87.

Hereupon, if there is no device discovered, the processing ends. Further, it is made possible to provide an internet connection service for devices residing in the vicinity by having the procedure shown in FIG. 10 executed periodically at arbitrary time intervals.

If there are connectable devices at the step S41, the control portion 81 successively judges whether devices being presently connected to the access point 74 have reached its maximum number, which is seven units in this case (Step S42). Whenever a connection is established with another device, the wireless communication portion 90 notifies of the fact thereof to the control portion 81 on the host side, and the information thereof is stored as a device connection status table in the RAM 83 or the memory portion 88, for example, as shown in FIG. 17. Device numbers shown in FIG. 17 shall be the same as those managed by such a table as shown in FIG. 11, as explained already in the first embodiment. In case that an ending time is not yet recorded, it means that the device is presently still being connected, and also, communication data volume indicates the volume of communications performed by wireless communications between the access point 74 and the device, which is to be renewed periodically. Further, the information shown in FIGS. 10, 11 and 17 can be stored as long as the RAM 83 or the memory portion 88 can store or may be deleted as well after a certain time has passed since they are newly added.

If the maximum number is reached, the control portion 81 judges whether there is a device to be disconnected among the devices being presently connected based on the information sets such as shown in FIGS. 10, 11 and 17 which are stored in the RAM 83 or the memory portion 88 (Step S43). For example, if there are devices having been connected more than a certain fixed time, for example, one hour, the devices may be judged as those to be disconnected. A rule for the judgment may be stored beforehand in the ROM 82 or may be provided for the RAM 83 or the memory portion 88 via various memory media connected to the drive 89. Furthermore, it may be possible as well to enable a user to set via the display portion 86 and the button input portion 87.

If it is judged that there are devices to be disconnected, the control portion 81 further judges which device shall be an object to be disconnected based on the information in FIGS. 10, 11 and 17 which are stored in the RAM 83 or the memory portion 88 (Step S44). Based on the information shown in FIG. 17, for example, a search is made for a device having been connected for the longest time and such device may be selected as the object to be disconnected, or a device having had the largest communication data volume may be selected as the object to be disconnected. Also, based on the information shown in FIG. 10, a device residing in the most remote place, which is the computer apparatus 71, for example, in case of the example shown in FIG. 14, may be selected as the object to be disconnected. Furthermore, by making a comprehensive judgment thereof, a device residing in a remote place and having been connected for long time may be selected as the object to be disconnected. Furthermore, when the access point 74 is set up in the center of, for example, a public facility and services thereof are to be provided impartially independent from the place, devices to be disconnected may be selected such that those devices are indiscriminately selected according to distances. A rule for the above judgment may be stored beforehand in the ROM 82 or may be provided for the RAM 83 or the memory portion 88 via various memory media connected to the drive 89. Furthermore, it may be possible as well to enable a user to set via the display portion 86 and the button input portion 87.

After a device to be disconnected is selected, the control portion 81 sends to the wireless communication portion 90 a command together with the device address thereof to disconnect the connection with the device, and the wireless communication portion 90 performs a disconnection processing and notifies again the control portion 81 of the result. When the disconnection processing is completed, the control portion 81 renews the information in the table shown in FIG. 16 which is stored in the RAM 83 or the memory portion 88 (Step S45).

Successively, the control portion 81 judges a device to establish a connection among the devices having been judged to be connectable at the previous step S41 based on the information shown in such tables as FIGS. 10, 11 and 17, which is stored in the RAM 83 or the memory portion 88 (Step S46). For example, the device residing in the closest vicinity, which is the computer apparatus 73 in case of the example in FIG. 14, may be selected as an object to be connected based on the information in such a table as shown in FIG. 10. Further, a device having responded most frequently to the inquiry may be selected as the object to be connected based on the information in such a table as shown in FIG. 10. Furthermore, a device having had long connection time in the past may be selected as the object to be connected based on the information in such a table as shown in FIG. 17, and on the contrary, a device having had short connection time or having not connected may be selected as the object to be connected. A rule for the above judgment may be stored beforehand in the ROM 82 or may be provided for the RAM 83 or the memory portion 88 via various memory media connected to the drive 89. Furthermore, it may be possible as well to enable a user to set via the display portion 86 and the button input portion 87.

After a device is selected as the object to be connected, the control portion 81 sends to the wireless communication portion 90 a command together with the device address thereof to perform a connection processing to the device, and the wireless communication portion 90 performs the connection processing and notifies again the control portion 81 of the result.

When the connection processing is completed, the control portion 81 renews the information in the table shown in FIG. 17 which is stored in the RAM 83 or the memory portion 88 (Step S47).

By the above processing, information relating to whether devices residing in the vicinity are connectable and also what distance they are located, viewing from the access point 74, is periodically obtained, and based on that, connection processing and furthermore disconnection processing are to be performed. Moreover, the present invention is also applicable to services such as providing constantly an accessing environment to an internet by periodically performing the processing shown in the flow chart of FIG. 16.

Further, in the configuration explained in the first embodiment, the mouse 3 can be configured to act similarly to the access point 74 explained in the second embodiment, in view of connecting for communication. The mouse 3 performs an inquiry to discover connectable devices residing in the vicinity such as a computer apparatus in accordance with the procedure shown in the flow chart of FIG. 5. Hereupon, the mouse 3 can perform the disconnection and connection processing in accordance with the procedure shown in the flow chart of FIG. 16. The processing at the step S41 can be performed in accordance with the procedure in the flow chart shown in FIG. 5. In the following processing at the step S42, the maximum number shall be set to one in this case, since a mouse conventionally handles only one connection. In the processing of the step S43, as a judgment processing for a device to be disconnected, for example, the mouse 3 can detect whether it is being operated by a user based on whether an input is given from its own position input portion 54 or from the button input portion 55 and can perform a disconnection processing, if there is no input given during a certain fixed time. Also, the above judgment processing may be performed as well by observing volume of data being transmitted and received in the wireless communication portion. At the step S46, a device residing in the nearest vicinity is selected based on the information in such tables as shown in FIGS. 10 and 11.

By repeating the above procedures, the mouse 3 establishes a connection with a device residing in as close vicinity as possible and disconnects its own connection, when it is detected that the mouse is not being used, and then, makes a selection of a new device to be connected. By doing so, it is not necessary for a user to execute various procedures by himself and therefore, it becomes possible to provide better operability, as the mouse automatically judges the device to be connected and performs the connection and disconnection.

The explanation is heretofore made with respect to an example of connection between the computer apparatus 1 and the mouse 3 in the state where the computer apparatuses 1, 2 and the mouse 3 are provided as shown in FIG. 1, or with respect to another example of connection and disconnection among the access point 74 and computer apparatuses in the state where the computer apparatuses 71, 72, 73 and the access point 74 are provided as shown in FIG. 14; however, the present invention is applicable to information processing apparatuses other than those stated above, for example, such as portable phones, digital cameras, digital video cameras, television sets, portable music players and headphones, when wireless communications are performed therewith. In those cases, as the configuration for the wireless communications, communication devices may be incorporated into the above equipment to be used exclusively for wireless communications; however it may be configured so as to function as a similar communication device by attaching a card or the like having circuitry for wireless communications, for example, to a data processing terminal device such as a personal computer apparatus and by having programs to perform processing explained in the above described flow charts installed in the terminal.

In addition, the inquiry procedure, the standby procedure and also the connection/disconnection procedure shown in FIGS. 5, 12, 13 and 16 may be executed in parallel at the same time by one device, or may be executed such that the standby procedure shall not be executed during execution of the inquiry procedure, and also, the inquiry procedure and the standby procedure shall not be executed during a connection for communication with another device. For example, the inquiry procedure and the standby procedure may be executed in parallel, when there is no connection established, and the standby procedure may be suspended so that the connection/disconnection procedure can be executed, when a device to be connected is discovered.

Also, as a wireless communication method, the Bluetooth communication is applied to the above described embodiments; however other wireless communication methods may be applied as well, as long as the methods are wireless communication methods which establish connections by similar inquiry processing and standby processing.

INDUSTRIAL APPLICABILITY

According to the present invention, by transmitting an inquiry message to devices residing in the vicinity with periodically altering a communication range, a relationship regarding distances of devices responding to the inquiry message can be recognized, so that based on the information a connection can be established with, for example, a device residing in as close vicinity as possible and a user can naturally and simply perform communications between devices.

For example, in case of an input apparatus such as a mouse, a operability without complexity can be provided for a user by automatically establishing a connection for communication with a device residing in the closest vicinity.

Moreover, when the present invention is applied to a service such as an access point of establishing connections Moreover, when the present invention is applied to a service such as an access point of establishing connections with a plurality of devices, a connection processing can be performed by automatically selecting devices to be connected and to be disconnected in response to their distances, so that it is possible to provide a user with more flexible services. In this case, it becomes possible to provide each user with an equal service by having a selection performed automatically further for a disconnection of an established connection based on connecting time or transmission data volume or the like. In addition, a maintenance management of an access point can be made simple by having the above processing automatically performed.

DESCRIPTION OF REFERENCE NUMERALS

1,2 . . . PERSONAL COMPUTER APPARATUS
3 . . . INPUT APPARATUS (MOUSE)
11 . . . CONTROL PORTION
12 . . . ROM
13 . . . RAM
14 . . . BUS LINE
15 . . . INPUT-OUTPUT INTERFACE
16 . . . DISPLAY PORTION
17 . . . KEYBOARD INPUT PORTION
18 . . . MEMORY PORTION
19 . . . DRIVE

20 ... MAGNETIC DISC
21 ... OPTICAL DISC
22 ... MAGNETO-OPTICAL DISC
23 ... SEMICONDUCTOR MEMORY
24 ... ANTENNA
30 ... WIRELESS COMMUNICATION PORTION
51 ... CONTROL PORTION
52 ... ROM
53 ... RAM
54 ... POSITION INPUT PORTION
55 ... BUTTON INPUT PORTION
56 ... BUS LINE
57 ... ANTENNA
60 ... WIRELESS COMMUNICATION PORTION
61 ... CONTROL PORTION
62 ... ROM
63 ... RAM
64 ... FLUSH MEMORY
65 ... INPUT-OUTPUT INTERFACE
66 ... BASE-BAND CONTROL PORTION
67 ... TRANCEIVER
68 ... BUS LINE
71,72,73 ... PERSONAL COMPUTER APPARATUS
74 ... ACCESS POINT
75 ... INTERNET
81 ... CONTROL PORTION
82 ... ROM
83 ... RAM
84 ... BUS LINE
85 ... INPUT-OUTPUT INTERFACE
86 ... DISPLAY PORTION
87 ... BUTTON INPUT PORTION
88 ... MEMORY PORTION
89 ... DRIVE
90 ... WIRELESS COMMUNICATION PORTION
91 ... ANTENNA
92 ... OUTSIDE NETWORK CONNECTION PORTION
93 ... MAGNETIC DISC
94 ... OPTICAL DISC
95 ... MAGNETO-OPTICAL DISC
96 ... SEMICONDUCTOR MEMORY

The invention claimed is:

1. A communication method for performing wireless communications with a plurality of communication devices, comprising:
wirelessly transmitting a plurality of inquiry messages from a transmitting device during a plurality of stages with periodically altering communication ranges to discover the plurality of communication devices residing within multiple communication ranges by periodically adjusting a transmission power in accordance with information relating to the transmission power stored in a memory such that a communication device residing in a close communication range receives an inquiry message more often than a communication device residing in a distant communication range during the plurality of stages;
receiving response messages from the plurality of communication devices responding to the inquiry messages during the plurality of stages, the response messages including identifications of the plurality of communication devices and lists of functions provided by the plurality of communication devices;
storing the identifications of the plurality of communication devices and the lists of functions provided by the plurality of communication devices;
storing count information in association with the stored identifications of the plurality of communication devices, the count information relating to the number of times the response messages were received from the respective communication devices during the plurality of stages, the count information indicative of a distance between the respective communication devices and the transmitting device; and
selecting, among the plurality of communication devices, a communication device having the highest count of the received response messages and providing a required function as a connection object for wireless communications based on the stored count information and the lists of functions, the selected communication device being in closest vicinity and providing the required function.

2. The communication method according to claim 1, wherein the selected communication device sent the response messages in a shortest communication range of the altering communication ranges and performs the required function.

3. The communication method according to claim 2, wherein the selected communication device that has the required function which has not been connected thereto is selected among communication devices having the required function.

4. The communication method according to claim 1, wherein, when a plurality of communication devices are selected at the same time or one after another as the connection object, the plurality of communication devices are selected almost evenly in a plurality of the communication ranges.

5. The communication method according to claim 1, further comprising:
selecting one of a plurality of connected communication devices based on at least one of connection time or communication data volume of the connected communication devices; and
disconnecting the selected communication device.

6. A communication system in which a first communication device performs wireless communications with second communication devices residing in the vicinity of the first communication device,
the first communication device comprising:
a memory,
a wireless communication means for altering communication ranges during a plurality of stages,
a transmission control means for wirelessly transmitting a plurality of inquiry messages from the wireless communication means during the plurality of stages by having the communication ranges altered periodically during the plurality of stages in order to discover the second communication devices residing within multiple communication ranges by periodically adjusting a transmission power in accordance with information relating to the transmission power stored in the memory such that a second communication device residing in a close communication range receives an inquiry message more often than a second communication device residing in a distant communication range during the plurality stages,
a receiving means for receiving response messages from the second communication devices responding to the inquiry messages during the plurality of stages, the response messages including identifications of the second communication devices and lists of functions provided by the second communication devices, a preservation means for storing the identifications of the second communication devices, and storing the lists of functions provided by the second communication devices and count information in association with the stored identifications of the second communication devices, the count information relating to the number of times the response messages were received by the first communication device from the respective second communication devices responding to the transmitted inquiry messages during the plurality of stages, the count information indicative of a distance between the first communication device and the respective second communication devices, and a connection means for selecting, among the second communication devices, a second communication device having the highest count of the received response messages and providing a required function to be a connection object for wireless communications with the first communication device based on the stored count information and the lists of functions, the selected second communication device being in closest vicinity to the first communication device and providing the required function; and the second communication devices comprising:

a wireless communication means; and a control means for transmitting a response message, when the inquiry message is received by the wireless communication means.

7. A first communication apparatus for wireless communications with second communication devices residing in the vicinity thereof, comprising:

a memory, a wireless communication means for altering communication ranges during a plurality of stages, a transmission control means for transmitting a plurality of inquiry messages during the plurality of stages by having the communication ranges altered periodically during the plurality of stages in order to discover the second communication devices residing within multiple communication ranges by periodically adjusting a transmission power in accordance with information relating to the transmission power stored in the memory such that a second communication device residing in a close communication range receives an inquiry message more often than a second communication device in a distant communication range during the plurality of stages, a receiving means for receiving response messages from the second communication devices responding to the inquiry messages during the plurality of stages, the response messages including identifications of the second communication devices and lists of functions provided by the second communication devices, a preservation means for storing the identifications of the second communication devices, and storing the lists of functions provided by the second communication devices and count information in association with the stored identifications of the second communication devices, the count information relating to the number of times the response messages were received from the respective second communication devices responding to the transmitted inquiry messages during the plurality of stages, the count information indicative of a distance between the first communication apparatus and the respective second communication devices, and a connection means for selecting, among the second communication devices, a second communication device having the highest count of the received response messages and providing a required function to be a connection object for wireless communications based on the stored count information and the lists of functions, the selected second communication device being in closest vicinity and providing the required function.

8. The first communication apparatus according to claim 7, wherein the selected second communication device sent the response message in a shortest communication range and is selected among the second communication devices that perform the required function.

9. The first communication apparatus according to claim 7, wherein, when a plurality of second communication devices are selected, the plurality of second communication devices are selected almost evenly in a plurality of communication ranges.

10. The first communication apparatus according to claim 7, further comprising:

a disconnection means for selecting one of a plurality of connected second communication devices based on at least one of connection time or communication data volume of the connected second communication devices, and disconnecting the selected second communication device.

* * * * *